Jan. 6, 1942.  W. A. MORRISON ET AL  2,269,033
CUSHIONING DEVICE
Filed May 24, 1940
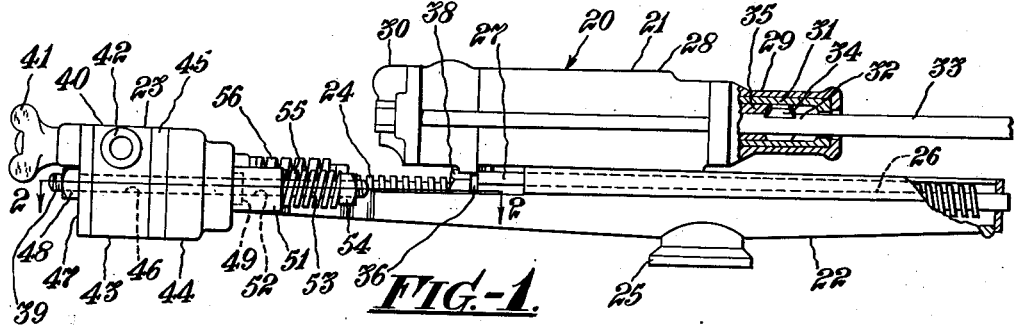
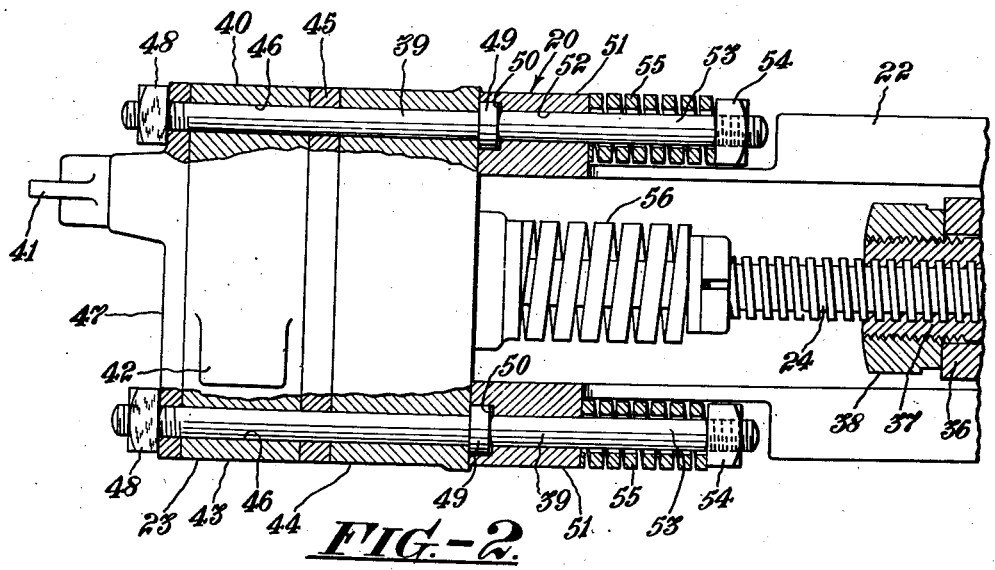
INVENTORS
William A. Morrison
And Albert R. Mack.
BY
THEIR ATTORNEY.

Patented Jan. 6, 1942

2,269,033

UNITED STATES PATENT OFFICE 2,269,033

CUSHIONING DEVICE

William A. Morrison, Easton, Pa., and Albert R. Mack, Phillipsburg, N. J., assignors to Ingersoll-Rand Company, New York, N. Y., a corporation of New Jersey Application May 24, 1940, Serial No. 336,914

1 Claim. (Cl. 255—45)

This invention relates to rock drilling mechanism, and more particularly to a feeding device for moving a rock drill to and from the work.

More particularly, the invention relates to a feeding device for a rock drill of the drifter type having a guide member along which the rock drill is actuated by a feed screw rotated by a rotary motor. In practice the guide member is secured to a supporting device, as for example, a bar or frame and the motor rotates the feed screw to move the rock drill along the guide member.

In operations in which a group of rock drills equipped with rotary feeding motors are mounted on the same support, it has been found that the combined forces of the feeding motors spring or bend the supporting member away from the work and when some of the rock drills of a battery have completed their run of drilling the pressure of the mounting must be borne by the drilling mechanisms still in operation. This pressure forces the rotary chucks of the rock drills hard against the working implements and tends to tilt them within the rock drill casings with the result that both the casings and the chucks become damaged.

It is accordingly an object of the invention to enable the rock drill and the feeding motor, rigidly attached thereto, to yield under a predetermined pressure against the working implement and thereby avoid damaging side thrust of the chuck parts against the casing housing.

Other objects will be in part obvious and in part pointed out hereinafter.

In the drawing accompanying this specification and in which similar reference numerals refer to similar parts, Figure 1 is a longitudinal side view, partly broken away, of a rock drill, its guide member and a rotary feeding motor for actuating the rock drill along the guide member, and Figure 2 is a plan view, partly broken away, taken through Figure 1 on the line 2—2.

Referring more particularly to the drawing and at first to Figure 1, the drilling mechanism designated in its entirety by 20, comprises a rock drill 21 mounted upon a guide member in the form of a shell 22, and at the rear end of the shell 22 is a feeding motor 23 for actuating the rock drill 21 longitudinally of the shell 22 through the instrumentality of a feed screw 24.

The shell 22 may be of a well known type having a cone 25 for cooperation with a suitable clamping device (not shown) whereby the drilling mechanism may be secured to a stationary mounting. In the opposed inner surfaces of the shell are longitudinally extending grooves 26 to receive, slidably, ribs 27 extending along opposite sides of the rock drill 21.

The rock drill 21 likewise may be of a conventional type comprising a cylinder 28 and front and back heads 29 and 30, respectively, which may be secured to the cylinder in any well known manner. The cylinder and the heads 29 and 30 constitute the casing parts of the rock drill and within the front head 29 is a chuck 31 to receive the shank end 32 of a drill steel 33 having lugs 34 to slidably interlock with the chuck.

The chuck 31 is of the rotary type to which rotational movement may be transmitted by suitable mechanism (not shown) incorporated in the rock drill in a well known manner, and in the chuck 31 is a bushing 35, the front end of which acts as an abutment for the lugs 34 to limit the distance that the working implement may extend into the rock drill.

On the rear end of the cylinder 28 of the rock drill and on the lower side thereof is a lug 36 located between the ribs 27 and in the lug 36 is a feed nut 37 that is in threaded engagement with the feed screw 24 and locked in position by a nut 38 seating against the end of the lug 36.

The motor 23, which is attached to the rear end of the shell 22 by rods 39, may be of the pressure fluid actuated rotary, preferably vane, type. Only the casing 40 of the motor is shown and its rotor (not shown) should be keyed or otherwise affixed to the rear end of the feed screw 24. Both the admission of pressure fluid into the motor and the direction of rotation of the motor may be controlled by a suitable valve of well known type (not shown) having a grip member 41 whereby it may be manipulated. The pressure fluid may be introduced into the casing 40 through a connection 42 on the side of the casing 40.

The casing 40, in the form illustrated, consists of rearward and front sections 43 and 44 and a plate 45 interposed between the sections. In the opposite sides of the sections 43 and 44 and the plate 45 are holes 46 to receive portions of the rods 39 that serve to clamp the casing parts of the motor securely together and also to clamp a cover plate 47 to the casing section 43. The rear ends of the rods are threaded to receive nuts 48 that seat against the cover plate, and intermediate the ends of the rods 39 are collars 49 that seat against the front end of the casing section 44.

In the assembled positions of the parts, the collars 49 lie within recesses 50 in the rear end of lugs 51 located on opposite sides of the shell 22, and in the lugs 51 are holes 52 to receive, slidably, portions 53 of the rods 39 lying forwardly of the collars 49. The portions 53 extend forwardly of the lugs 51. Their front ends are threaded to receive nuts 54, and between the nuts 54 and the lugs 51 are springs 55 that encircle the rods 39 to resiliently oppose rearward movement of the portions 53 of the rods in the lugs 51.

A suitable cushioning device of the type forming the subject matter of U. S. Patent #2,208,751 granted to A. F. Dicker, Sr., July 23, 1940 and shown as being in the form of a spring 56 encircling the feed screw, is seated against the front end of the casing section 44 to provide a yieldable abutment for the feed nut 37 to prevent said nut from seating against a rigid element of the drilling mechanism.

In the operation of the device, whenever circumstances are such that a considerable pressure is exerted upon the working implement and thus against the chuck parts of a rock drill by the supporting member in any position of the feed nut 37 along the length of the screw 24 the rock drill is thrust rearwardly and this movement is transmitted through the feed screw 24 to the feeding motor. Inasmuch as the rods 39 are capable of slidable movement in the lugs 51 the motor will also be moved rearwardly and the pressure against the chuck parts will be relieved so that they may be rotated without serious friction between them and the front head 29. During the rearward movement of the motor the springs 55 are compressed and when the parts of the drilling mechanism have again assumed their normal positions the springs 55 acting against the nuts 54 and the lugs 51 will thrust the motor against the rear end of the shell 22 to its normal position.

We claim:

In a feeding device, the combination of a guide member and a rock drill slidable thereon, a feed screw slidable longitudinally on the guide member and threadedly connected to the rock drill, a motor connected to the feed screw for rotating the feed screw and having a casing divided into sections, rods to secure the casing sections together and being slidable in the guide member, and springs on the rods seating against the guide member to cushion the endwise movement of the rods.

WILLIAM A. MORRISON.
ALBERT R. MACK.